(12) United States Patent
Lei (10) Patent No.: US 9,797,742 B2
(45) Date of Patent: Oct. 24, 2017

(54) NAVIGATION SYSTEM WITH SPEED CALCULATION MECHANISM AND METHOD OF OPERATION THEREOF

(71) Applicant: Telenav, Inc., Sunnyvale, CA (US)

(72) Inventor: Liu Lei, Santa Clara, CA (US)

(73) Assignee: Telenav, Inc., Santa Clara, CA (US)

( * ) Notice: Subject to any disclaimer, the term of this patent is extended or adjusted under 35 U.S.C. 154(b) by 247 days.

(21) Appl. No.: 14/643,937

(22) Filed: Mar. 10, 2015

(65) Prior Publication Data

US 2015/0260522 A1  Sep. 17, 2015

Related U.S. Application Data

(60) Provisional application No. 61/951,631, filed on Mar. 12, 2014.

(51) Int. Cl.
*G01C 21/00* (2006.01)
*G01C 21/36* (2006.01)
*G08G 1/052* (2006.01)
*G01P 1/12* (2006.01)

(52) U.S. Cl.
CPC ......... *G01C 21/3697* (2013.01); *G01P 1/122* (2013.01); *G08G 1/052* (2013.01)

(58) Field of Classification Search
None
See application file for complete search history.

(56) References Cited

U.S. PATENT DOCUMENTS 5,828,585 A   10/1998  Welk et al.
7,075,459 B1   7/2006  Begin et al.
2013/0090830 A1  4/2013  Eisele

FOREIGN PATENT DOCUMENTS

EP   2600161 A1   5/2013

*Primary Examiner* — Rami Khatib
*Assistant Examiner* — Gerrad A Foster
(74) *Attorney, Agent, or Firm* — IP Investment Law Group (57) ABSTRACT

A method of operation of a navigation system includes: calculating a speed difference value based on a sensor speed measurement and a location speed measurement; generating a speed probability distribution with the speed difference value and the sensor speed measurement calculating a density regression based on a speed density peak of the speed probability distribution; determining a speed adjustment factor from the density regression; and calculating an adjusted sensor speed from the sensor speed measurement with the speed adjustment factor.

20 Claims, 6 Drawing Sheets

NAVIGATION SYSTEM WITH SPEED CALCULATION MECHANISM AND METHOD OF OPERATION THEREOF

CROSS-REFERENCE TO RELATED APPLICATION(S)

This application claims the benefit of U.S. Provisional Patent Application Ser. No. 61/951,631 filed Mar. 12, 2014, and the subject matter thereof is incorporated herein by reference thereto.

TECHNICAL FIELD

An embodiment of the present invention relates generally to a navigation system, and more particularly to a system for speed calculation.

BACKGROUND

Modern consumer and industrial electronics, especially devices such as graphical navigation systems, cellular phones, portable digital assistants, and combination devices, are providing increasing levels of functionality to support modern life. Research and development in the existing technologies can take a myriad of different directions.

As users become more empowered with the growth of mobile communication technology, new and old paradigms begin to take advantage of this new space. One consumer electronics growth, where mobility is quintessential, is in location based services, such as navigation systems utilizing satellite-based Global Positioning System (GPS) devices. Location based services allow users to create, transfer, store, and/or consume information in order for users to create, transfer, store, and consume in the "real world". One such use of location based services is to calculate vehicle speed based on vehicle location. However, accurate determination of vehicle speed with location based services has eluded those of skill in the art.

Thus, a need still remains for a navigation system with speed calculation mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those of skill in the art.

SUMMARY

An embodiment of the present invention provides an apparatus, including: a control unit configured to: calculate a speed difference value based on a sensor speed measurement and a location speed measurement; generate a speed probability distribution with the speed difference value and the sensor speed measurement; calculate a density regression based on a speed density peak of the speed probability distribution; determine a speed adjustment factor from the density regression; calculate an adjusted sensor speed from the sensor speed measurement with the speed adjustment factor; and a storage unit, coupled to the control unit, configured to store the sensor speed measurement and the speed difference value.

An embodiment of the present invention provides a method including: calculating a speed difference value based on a sensor speed measurement and a location speed measurement; generating a speed probability distribution with the speed difference value and the sensor speed measurement; calculating a density regression based on a speed density peak of the speed probability distribution; determining a speed adjustment factor from the density regression; and calculating an adjusted sensor speed from the sensor speed measurement with the speed adjustment factor.

An embodiment of the present invention provides a non-transitory computer readable medium including instructions for operating a navigation system, including: calculating a speed difference value based on a sensor speed measurement and a location speed measurement; generating a speed probability distribution with the speed difference value and the sensor speed measurement; calculating a density regression based on a speed density peak of the speed probability distribution; determining a speed adjustment factor from the density regression; and calculating an adjusted sensor speed from the sensor speed measurement with the speed adjustment factor.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which information is expressed is not critical to some embodiments of the invention. For example, in some embodiments, information is presented in the format of (X, Y); where X and Y are two coordinates that define the location in a chart or graph.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims sections below, the modules are deemed to include hardware circuitry for the purposes and the scope of the apparatus claims.

Figure 1:
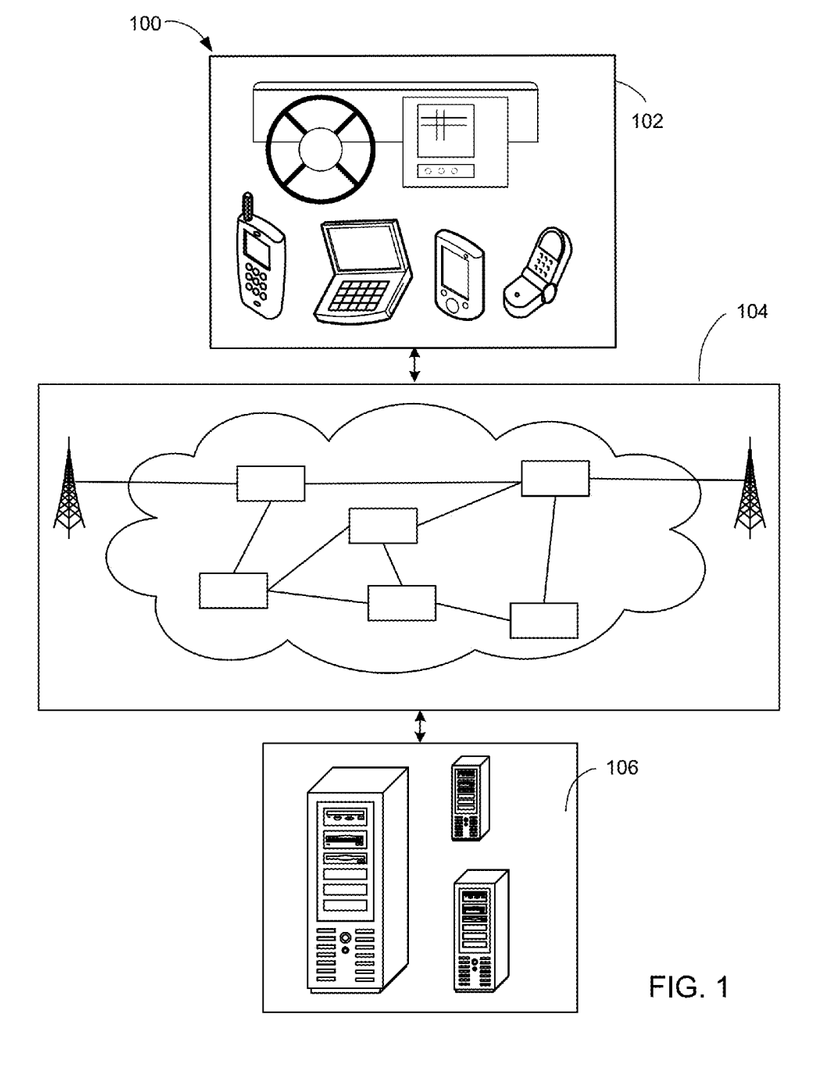
FIG. 1 is a navigation system with speed calculation mechanism in an embodiment of the present invention.

Referring now to FIG. 1, therein is shown a navigation system 100 with speed calculation mechanism in an embodiment of the present invention. The navigation system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a smart phone, cellular phone, personal digital assistant, a tablet computer, a notebook computer, or other mobile computing device. The first device 102 can couple, either directly or indirectly, to the communication path 104 to communicate with the second device 106 or can be a stand-alone device.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
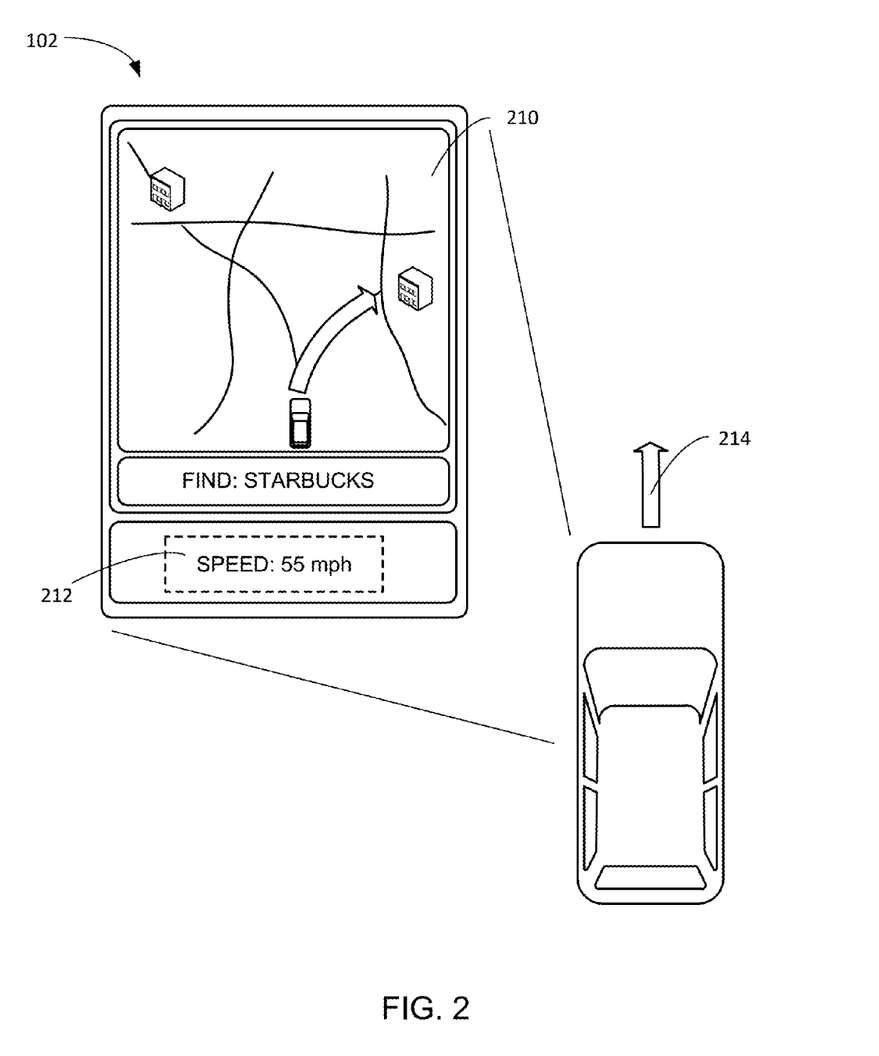
FIG. 2 is an example of the first device of FIG. 1.

Referring now to FIG. 2, therein is shown an example of the first device 102 of FIG. 1. For illustrative purposes, the first device 102 is shown as located within or is embodied as a user's vehicle. In one example, the first device 102 can be a separate independent or stand-alone device from the user's vehicle, such as a mobile device including a smart phone, cellular phone, personal digital assistant, a tablet computer, a notebook computer, or other mobile computing devices. In this example, the first device 102 can interface physically with the user's vehicle, such as through a wired connection, or wirelessly through such as through a Bluetooth connection.

In another example, the first device 102 can be integrated with the user's vehicle. Specific examples can include a device or instrument embedded in the vehicle dashboard, such as the speedometer, or center console display system.

A display interface 210 depicts a user's vehicle traveling along a route and can display an adjusted sensor speed 212, which is an adjusted estimation of a vehicle speed 214 of the user's vehicle. For illustrative purposes, the vehicle speed 214 is depicted by the solid arrow. The adjusted sensor speed 212 can be a calculated estimation that corrects for errors or deficiencies in other methods estimating the vehicle speed 214. For example, the vehicle speed 214 estimated based on the Doppler Effect of a GPS satellite signal can suffer from low accuracy and frequency of available speed in GPS information. Such estimations can be unreliable and not well suited for direct or independent use in a Dead Reckoning system, such as for the navigation system 100.

In another example, the vehicle speed 214 estimated from instruments or sensors attached to the user's vehicle, such as a sensor attached or coupled to the wheel axle of the user's vehicle can be more reliable and provide information at a higher frequency relative to those based on GPS information. However, sensor based estimations of the vehicle speed 214 can be biased because of the changes in the radius of the wheel. As a more specific example, the radius of the wheel can change due to tire wear, changing the tires, different load of the vehicle and many other factors.

For illustrative purposes, the navigation system 100 is shown presenting the adjusted sensor speed 212 on the display interface 210 of a mobile device, although it is understood that the adjusted sensor speed 212 can be represented in a number of different ways. For example, the navigation system 100 can present the adjusted sensor speed 212 on the display interface 210 of the first device 102 that is integrated with the user's vehicle. As a specific example, the display interface 210 can be a unit that is physically attached or integrated with the user's vehicle, such as a dash board display, heads-up display, or center panel display. In another example, the navigation system 100 can interface with the speedometer of the user's vehicle to present the adjusted sensor speed 212.

Figure 3:
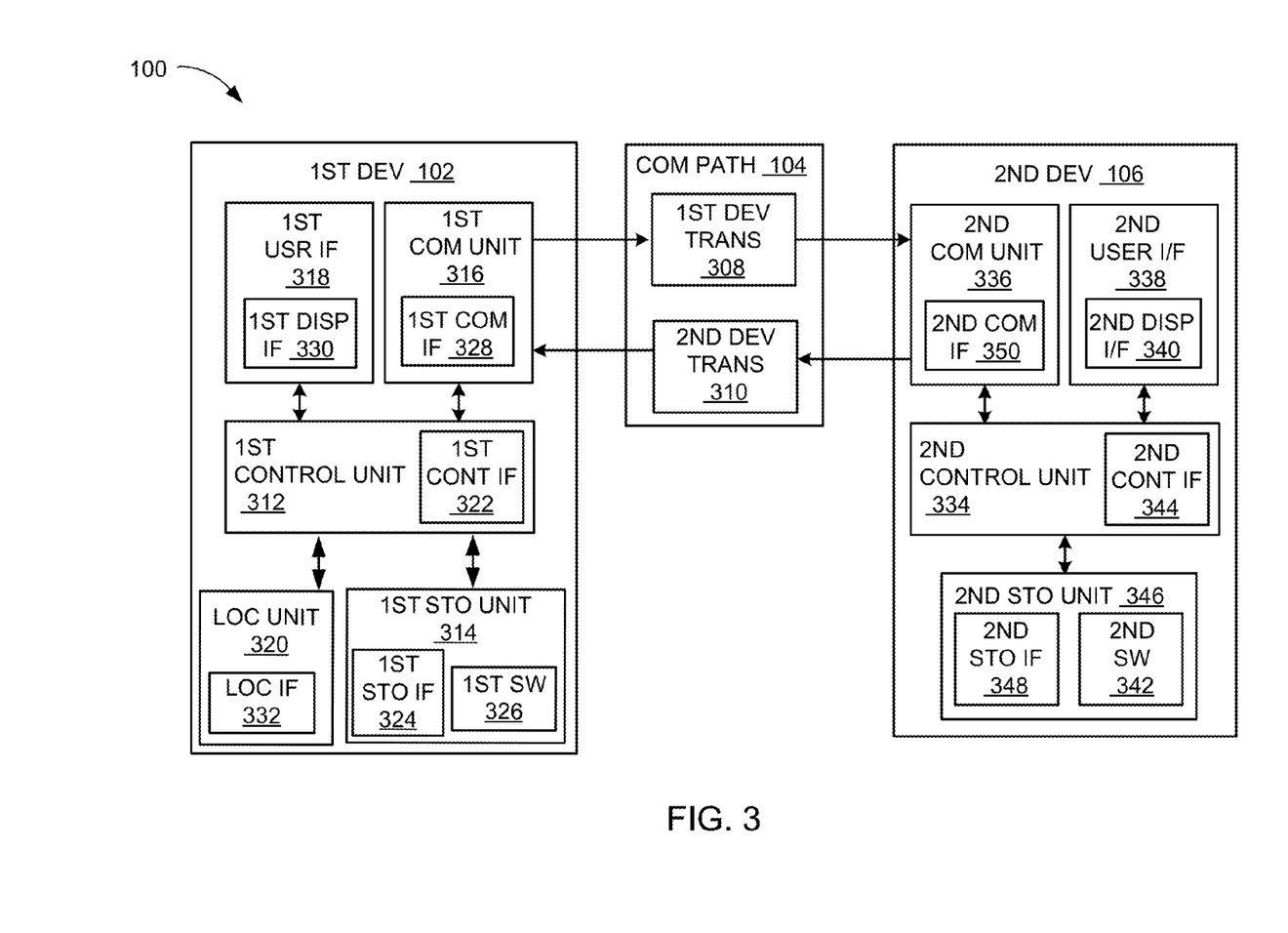
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations physically separate from the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations physically separate from the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs. The first user interface 318 can include the display interface 210 of FIG. 2.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations physically separate from the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations physically separate from the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
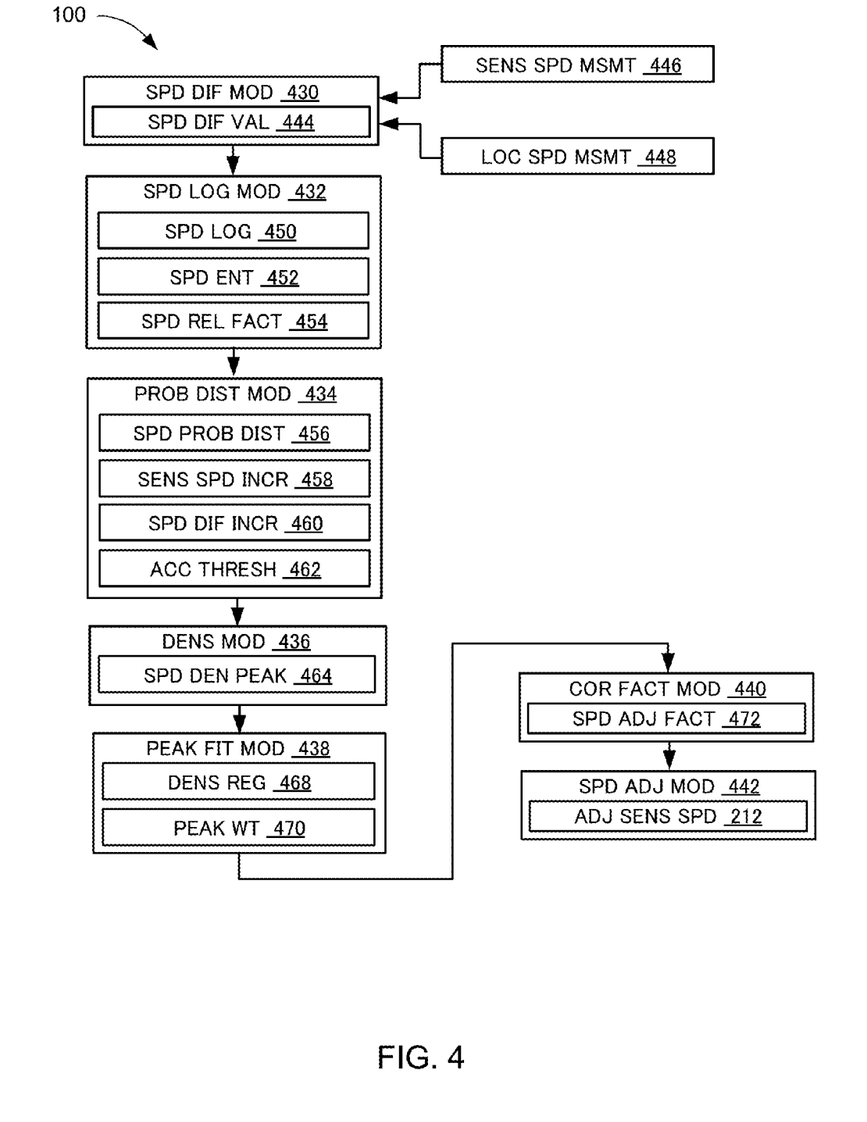
FIG. 4 is a control flow of the navigation system.

Referring now to FIG. 4, therein is shown a control flow of the navigation system 100. The navigation system 100 can include a speed difference module 430, a speed log module 432, a probability distribution module 434, a density module 436, a peak fit module 438, a correction factor module 440, and a speed adjustment module 442. The speed log module 432 can be coupled to the speed difference module 430. The probability distribution module 434 can be coupled to the speed log module 432. The density module 436 can be coupled to the probability distribution module 434. The peak fit module 438 can be coupled to the density module 436. The correction factor module 440 can be coupled to the peak fit module 438. The speed adjustment module 442 can be coupled to the correction factor module 440.

The speed difference module 430 is for calculating a difference in speed values from different sources of speed information. The speed difference module 430 can calculate a speed difference value 444 from a sensor speed measurement 446 and a location speed measurement 448.

The sensor speed measurement 446 is defined as an estimation speed based on motion of mechanical components of a vehicle. For example, the sensor speed measurement 446 can be estimated based on the output of the transmission or drive shaft of a vehicle, as used in an eddy current speedometer or electronic speedometer, respectively. The sensor speed measurement 446 can be calculated based on the raw or un-calibrated sensor information provided from the sensors attached to the user's vehicle.

The location speed measurement 448 is defined as an estimation of speed based on the change in location or position over time. For example, the location speed measurement 448 can be calculated based on the GPS tracking, cellular triangulation, or WiFi signal of the vehicle. As a specific example, the location speed measurement 448 can be calculated based on GPS readings of the user's vehicle received from the location unit 320 of FIG. 3. The speed difference module 430 can received or calculate the location speed measurement 448. As an example, the location speed measurement 448 can be calculated by a number of different methods, such as with position over time interpolation or signal Doppler Effect.

The speed difference module 430 can calculate the sensor speed measurement 446 as the difference between the location speed measurement 448 and the sensor speed measurement 446. For example, the speed difference module 430 can calculate the speed difference value 444 for each received instance of the location speed measurement 448 and the sensor speed measurement 446 according to the following equation:

$$\text{Speed difference value}_i = \text{location speed measurement}_i - \text{sensor speed measurement}_i$$

The subscript "i" denotes an instance of the respective values above. The speed difference value 444 can be used by the subsequent modules to determine the adjusted sensor speed 212.

The speed log module 432 is for maintaining and updating a log of entries for differences in speed measurements and the corresponding speed measurements used to calculate the differences in speed. For example, the speed log module 432 can maintain and update a speed log 450 that include speed entries 452, which are corresponding pairs of the speed difference value 444 and the value of the sensor speed measurement 446 used to calculate the speed difference value 444. The speed log module 432 can maintain the speed log 450 by saving or storing the speed log 450 in a storage device, such as the first storage unit 314 of FIG. 3.

The speed log module 432 can update the speed log 450 by adding and removing the speed entries 452. For example, the speed log module 432 can add the speed entries 452 with a time stamp, which identifies the date and time the speed difference value 444 was calculated and the sensor speed measurement 446 for one of the speed entries 452. The speed log module 432 can maintain the speed log 450 in chronological order according to the time stamps of the speed entries 452.

The speed log module 432 can remove the speed entries 452, including the speed difference value 444 and the sensor speed measurement 446, from the speed log 450 based on a speed relevance factor 454. The speed relevance factor 454 is defined as a threshold for determining removal of information from a list.

For example, the speed relevance factor 454 can be based on a threshold of the total number of entries, a temporal threshold, or a combination thereof. In a specific example, the speed relevance factor 454 can be a temporal threshold to indicate removal after a set period of time. In another specific example, the speed relevance factor 454 can be a threshold number of entries in the speed log 450 such that once the speed log 450 reaches the speed relevance factor 454 value, the speed entries 452 at the end of the speed log 450 are removed when new instances of the speed entries 452 are added. In a further specific example, the speed relevance factor 454 can be a combination of both a temporal and numerical threshold such that the temporal threshold is not applied until after the numerical value is reached.

The probability distribution module 434 is for generating a probability distribution of speed measurements and difference in speed measurements. For example, the probability distribution module 434 can generate a speed probability distribution 456 as a two dimensional kernel density estimation with the speed difference value 444 and the sensor speed measurement 446 of each of the speed entries 452 in the speed log 450.

The probability distribution module 434 can generate the speed probability distribution 456 as a chart with sensor speed increments 458 along the horizontal or x-axis of the speed probability distribution 456 and speed difference increments 460 along the vertical or y-axis of the speed probability distribution 456. An illustration of the speed probability distribution 456, including the x-axis and the y-axis, is included in FIG. 5, below.

The speed difference increments 460 are increments that represent measurements of changes in speed. For example, the sensor speed increments 458 can have a value of zero at the origin and can increase linearly in positive value.

The speed difference increments 460 are increments that represent differences in speed. For example, the speed difference increments 460 can have a value of zero at the origin and can represent positive values of the speed difference value 444 above the x-axis and negative values of the speed difference value 444 below the x-axis.

The probability distribution module 434 can plot or populate the speed probability distribution 456 with each of the speed entries 452 in the speed log 450 with the sensor speed measurement 446 as the abscissa or x-coordinate and the speed difference value 444 as the ordinate or y-coordinate. Optionally, the probability distribution module 434 can generate the speed probability distribution 456 based on an accuracy threshold 462.

The accuracy threshold 462 is defined as a threshold that is used to identify the limits for accurate speed measurement. For example, low speed measurements, such as speeds measurements below five miles per hour (mph) or an equivalent thereof, are difficult to measure accurately. In this example, the accuracy threshold 462 can be set to 5 mph or an equivalent thereof. However, the accuracy threshold 462 can change based on the ability to accurately measure low speed. For example, if the sensor speed measurement 446, the location speed measurement 448, or a combination thereof, is determined to be accurate up to 3 mph, the accuracy threshold 462 can be set to 3 mph.

The probability distribution module 434 can generate the speed probability distribution 456 based on the accuracy threshold 462 by omitting instances of the speed entries 452 from the speed probability distribution 456 that do not meet the accuracy threshold 462. For example, if the sensor speed measurement 446 is a value of 3 miles per hour, and the accuracy threshold 462 is 5 miles per hour, the probability distribution module 434 can omit the instance of the speed entries 452 that includes the 3 miles per hour value of the sensor speed measurement 446 when generating the speed probability distribution 456.

The density module 436 is for determining peaks in density for points representing the speed and difference in speed within a probability distribution. For example, the density module 436 can calculate a speed density peak 464 for each of the sensor speed increments 458.

The speed density peak 464 is defined as a local maximum of a probability distribution. As an example, the density module 436 can determine the speed density peak 464 by identifying the (x, y) coordinates representing the point having the highest density of points representing the speed entries 452, which include corresponding pairs of the speed difference value 444 and the value of the sensor speed measurement 446, along a given instance of the sensor speed increments 458. The density module 436 can determine the speed density peak 464 for each of the sensor speed increments 458 of the speed probability distribution 456.

The peak fit module 438 is for determining a relationship between points in a probability distribution. For example, the peak fit module 438 can determine the relationship between the instances of the speed density peak 464 for each of the sensor speed increments 458 by calculating a density regression 468.

The density regression 468 is defined as a statistical fit of peaks or local maxima in a probability function. For example, the density regression 468 can be a regression line for the instances of the speed density peak 464 for each of the sensor speed increments 458.

The peak fit module 438 can calculate the density regression 468 in a number of different ways. For example, the peak fit module 438 can calculate the density regression 468 with a method of least square for the density coordinates which are the x and y coordinates representing the speed density peak 464 of each of the sensor speed increments 458.

Optionally, the peak fit module 438 can calculate the density regression 468 with a method of weighted least square as an alternative to the method of least square. The density regression 468 calculated with the weighted least square method can be based on a peak weight 470 of the speed density peak 464. The peak weight 470 is defined as an adjustment factor to account for the relative significance of one value to other values. For example, the peak weight 470 can account for the statistical significance of the speed density peak 464 for one instance of the sensor speed increments 458 relative to the speed density peak 464 for the other instances of the sensor speed increments 458.

The peak weight 470 can be determined based on the number of the speed entries 452 for each of the sensor speed increments 458. For example, the peak weight 470 of the speed density peak 464 for one of the sensor speed increments 458 having a larger number of the speed entries 452 can be greater than the peak weight 470 of the speed density peak 464 for another of the sensor speed increments 458 with fewer number of the speed entries 452. The peak fit module 438 can calculate the density regression 468 based on the peak weight 470 such that the density regression 468 more heavily favors the speed density peak 464 having a value of the peak weight 470 that is greater than the speed density peak 464 with the peak weight 470 of a lower relative value.

The correction factor module 440 can determine a speed adjustment factor 472 based on the density regression 468. The speed adjustment factor 472 is defined as a correction factor to adjust for error in speed calculation based on measurements taken from the vehicle. As an example, the correction factor module 440 can determine the speed adjustment factor 472 as the slope of the density regression 468.

The speed adjustment module 442 is for calculating the adjusted sensor speed 212 for the user's vehicle. The speed adjustment module 442 can calculate the adjusted sensor speed 212 with the speed adjustment factor 472. For example, can calculate the adjusted sensor speed 212 as a product of the sensor speed measurement 446 and the speed adjustment factor 472. The speed adjustment module 442 can calculate the adjusted sensor speed 212 continuously by taking the product of the speed adjustment factor 472 and the each instance of the sensor speed measurement 446 received by the navigation system 100.

It has been discovered that removing the speed entries 452 that include the speed difference value 444 and the sensor speed measurement 446, from the speed log 450 with the speed relevance factor 454 improves accuracy of the adjusted sensor speed 212. Removing the speed difference value 444 with the speed relevance factor 454 enables the navigation system 100 to retain values that can be the most relevant or up to date, which improves the calculation of the adjusted sensor speed 212.

It has also been discovered that generating the speed probability distribution 456 with the accuracy threshold 462 can improve the accuracy when calculating the adjusted sensor speed 212. The accuracy threshold 462 removes the low speed values of the sensor speed measurement 446 that can be inaccurate, which enables the navigation system 100 to calculate the density regression, and subsequently, the speed adjustment factor 472 that is based on more accurate measurements of the vehicle speed, which improves accuracy for calculating the adjusted sensor speed 212.

It has further been discovered that calculating the adjusted sensor speed 212 based on the speed difference value 444 between the sensor speed measurement 446 and the location speed measurement 448 provides an estimation of speed that is more accurate than the sensor speed measurement 446 or the location speed measurement 448 alone. The location speed measurement 448 can have be received at a lower frequency relative to the sensor speed measurement 446 but is not affected by vehicle factors, such as differing tire diameters or vehicle loading. Calculating the sensor speed measurement 446 can be calibrated with the location speed measurement 448 to adjust for the vehicle factors, which provides the adjusted sensor speed 212 that is an accurate estimation of the vehicle speed.

The physical transformation from calculating the adjusted sensor speed 212 with the sensor speed measurement 446 and the location speed measurement 448 results in the movement in the physical world, such as changing speeds of the user's vehicle to comply with speed limits. As the movement in the physical world occurs, such as changes in the vehicle speed of the user's vehicle, the movement itself creates additional information that is converted back into the navigation system 100 as new instances of the sensor speed measurement 446 and the location speed measurement 448 for calculating the adjusted sensor speed 212 for the continued operation of the navigation system 100 and to continue the movement in the physical world.

The first software 326 of FIG. 3 can include the modules for the navigation system 100. For example, the first software 326 can include the speed difference module 430, the speed log module 432, the probability distribution module 434, the density module 436, the peak fit module 438, the correction factor module 440, the speed adjustment module 442 or a combination thereof.

The first control unit 312 of FIG. 3 can execute the first software 326 to implement the speed difference module 430 and the speed log module 432. For example, the first control unit 312 can be configured to implement the speed difference module 430 for receiving the location speed measurement 448 from the location unit 320 and the sensor speed measurement 446 from the vehicle speed sensor and for calculating the speed difference value 444. In another example, the first control unit 312 can be configured to implement the speed log module 432 for generating the speed log 450 from the sensor speed measurement 446 and the speed difference value 444.

The first control unit 312 can be configured to implement the probability distribution module 434, the density module 436, the peak fit module 438, and the correction factor module 440. For example, the first control unit 312 can be configured to implement the probability distribution module 434 for generating the speed probability distribution 456 with the speed difference value 444 and the sensor speed measurement 446. In another example, the first control unit 312 can be configured to implement the density module 436 for determining the speed density peak 464 for each of the sensor speed increments 458. In a further example, the first control unit 312 can be configured to implement the peak fit module 438 for calculating the density regression 468 from the speed density peak 464. In yet a further example, the first control unit 312 can be configured to implement the correction factor module 440 for determining the speed adjustment factor 472 from the density regression 468.

The first control unit 312 can be configured to implement the speed adjustment module 442 for calculating the adjusted sensor speed 212 with the speed adjustment factor 472 and the sensor speed measurement 446. The first control unit 312 can interface with the first display interface 210 display the adjusted sensor speed 212 on the first device 102.

Alternatively, the second software 342 of FIG. 3 can include the modules for the navigation system 100. For example, the second software 342 can include the speed difference module 430, the speed log module 432, the probability distribution module 434, the density module 436, the peak fit module 438, the correction factor module 440, the speed adjustment module 442 or a combination thereof.

The second control unit 334 of FIG. 3 can execute the second software 342 to implement the speed difference module 430 and the speed log module 432. For example, the second control unit 334 can be configured to implement the speed difference module 430 for receiving the location speed measurement 448 from the location unit 320 and the sensor speed measurement 446 from the vehicle speed sensor and for calculating the speed difference value 444. In another example, the second control unit 334 can be configured to implement the speed log module 432 for generating the speed log 450 from the sensor speed measurement 446 and the speed difference value 444.

The second control unit 334 can be configured to implement the probability distribution module 434, the density module 436, the peak fit module 438, and the correction factor module 440. For example, the second control unit 334 can be configured to implement the probability distribution module 434 for generating the speed probability distribution 456 with the speed difference value 444 and the sensor speed measurement 446. In another example, the second control unit 334 can be configured to implement the density module 436 for determining the speed density peak 464 for each of the sensor speed increments 458. In a further example, the second control unit 334 can be configured to implement the peak fit module 438 for calculating the density regression 468 from the speed density peak 464. In yet a further example, the second control unit 334 can be configured to implement the correction factor module 440 for determining the speed adjustment factor 472 from the density regression 468.

The second control unit 334 can be configured to implement the speed adjustment module 442 for calculating the adjusted sensor speed 212 with the speed adjustment factor 472 and the sensor speed measurement 446. The second control unit 334 can interface with the first display interface 210 display the adjusted sensor speed 212 on the first device 102.

The modules of the navigation system 100 can be partitioned between the first software 326 and the second software 342. For example, the first software 326 can include the speed difference module 430, the speed log module 432, and the speed adjustment module 442. Based on the size of the first storage unit 314 of FIG. 3, the first software 326 can include additional modules of the navigation system 100. The first control unit 312 can execute the modules partitioned on the first software 326 as previously described. The first control unit 321 can implement the first display interface 210, the location unit 320, the first storage unit 314, or first communication unit 316 as previously described above.

The second software 342 can include the probability distribution module 434, the density module 436, the peak fit module 438, and the correction factor module 440. The second control unit 334 can execute modules partitioned on the second software 342 as previously described. The second control unit 334 can implement the second control unit 334 can implement the other hardware units, such as the second display interface 210, the second storage unit 346, or the second communication unit 336 as previously described above.

The navigation system 100 describes the module functions or order as an example. The modules can be partitioned differently. For example, the speed difference module 430 can be directly coupled to the probability distribution module 434. Each of the modules can operate individually and independently of the other modules. Furthermore, data generated in one module can be used by another module without being directly coupled to each other. For example, the probability distribution module 434 can receive the sensor speed measurement 446, the speed difference value 444, or a combination thereof, directly from the speed difference module 430.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 5:
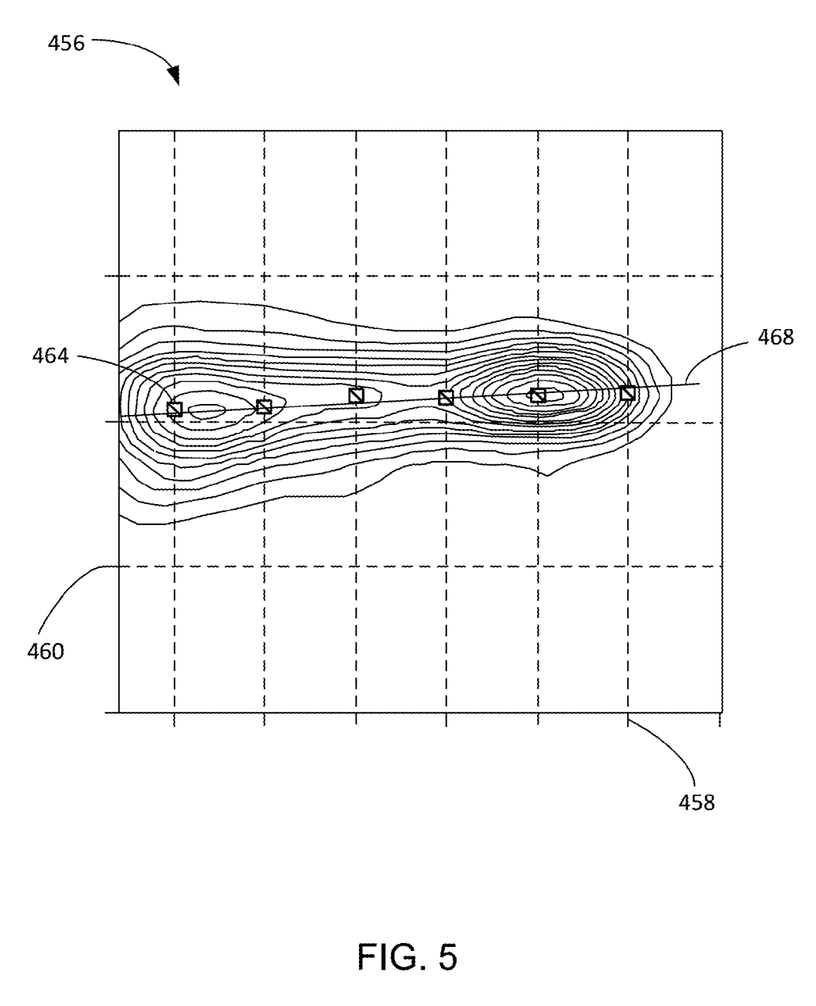
FIG. 5 is shown an example of the speed probability distribution.

Referring now to FIG. 5, therein is shown an example of the speed probability distribution 456. The speed probability distribution 456 depicts the sensor speed increments 458 along the x-axis and the speed difference increments 460 on the y-axis. The topographical rings depict the densities of the speed entries 452 of FIG. 4 as the speed difference value 444 of FIG. 4 and sensor speed measurement 446 of FIG. 4 coordinate pairs. For illustrative purposes, speed probability distribution 456 is shown having a set number of the sensor speed increments 458, although it is understood that the speed probability distribution 456 can include more or fewer instances of the sensor speed increments 458.

The speed probability distribution 456 is shown with the speed density peak 464 for the sensor speed increments 458, which are depicted as the "x-marks" within a square. The speed density peak 464 can represent the point of highest density of the speed entries 452 of FIG. 4 along one of the sensor speed increments 458.

The density regression 468 can be calculated for the speed density peak 464 of each of the sensor speed increments 458. In this example of the speed probability distribution 456, the density regression 468 is depicted as the solid line.

Figure 6:
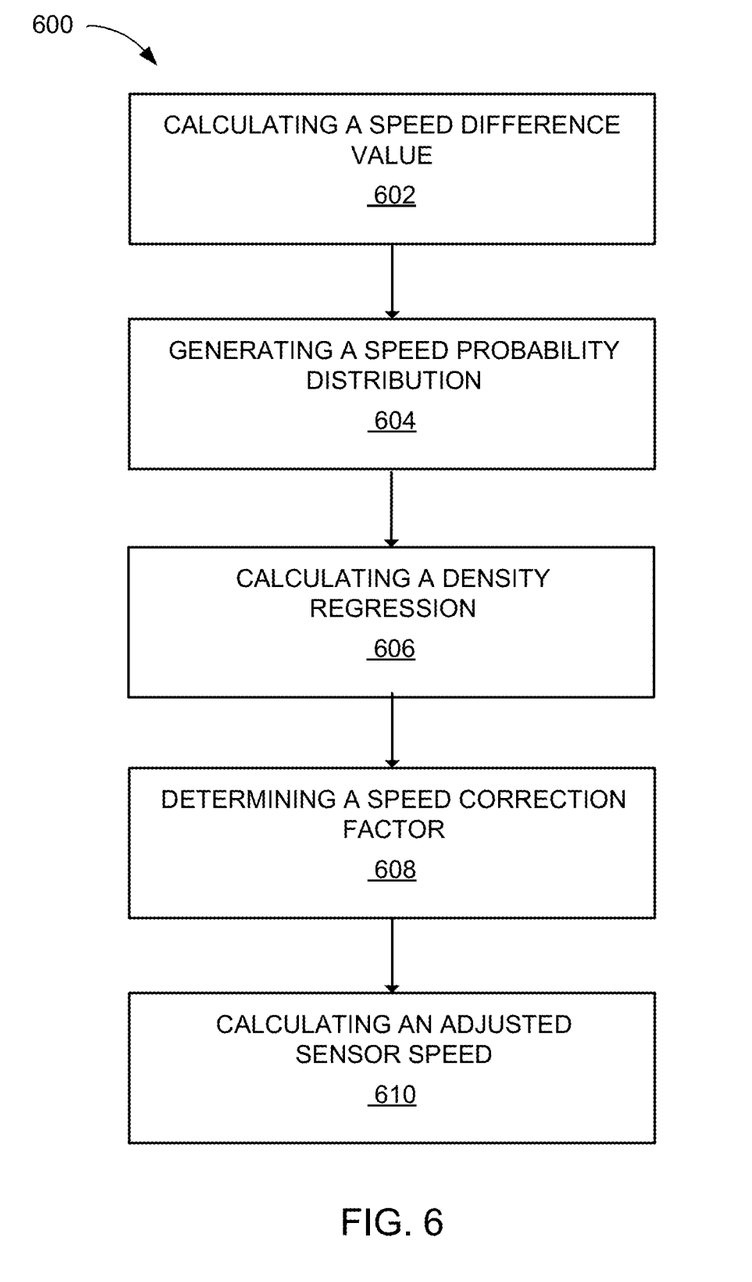
FIG. 6 is a flow chart of a method of operation of a navigation system in an embodiment of the present invention.

Referring now to FIG. 6, therein is shown a flow chart of a method 600 of operation of a navigation system 100 in an embodiment of the present invention. The method 600 includes: calculating a speed difference value based on a sensor speed measurement and a location speed measurement in a block 602; generating a speed probability distribution with the speed difference value and the sensor speed measurement in a block 604; calculating a density regression based on a speed density peak of the speed probability distribution in a block 606; determining a speed adjustment factor from the density regression in a block 608; and calculating an adjusted sensor speed from the sensor speed measurement with the speed adjustment factor in a block 610.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
    a control unit, including a processor, configured to:
        calculate a speed difference value based on a sensor speed measurement and a location speed measurement, wherein the location speed measurement is calculated based on global positioning system tracking;
        generate a speed probability distribution with the speed difference value and the sensor speed measurement;
        calculate a density regression based on a speed density peak of the speed probability distribution;
        determine a speed adjustment factor from the density regression;
        calculate an adjusted sensor speed from the sensor speed measurement with the speed adjustment factor; and
    a storage unit, coupled to the control unit, configured to store the sensor speed measurement and the speed difference value.

2. The system as claimed in claim 1 wherein the control unit is configured to generate the speed probability distribution based on an accuracy threshold.

3. The system as claimed in claim 1 wherein the control unit is configured to calculate the density regression based on a peak weight of the speed density peak.

4. The system as claimed in claim 1 wherein the control unit is configured to:
    generate a speed log having speed entries with pairs of the speed difference value and the sensor speed measurement; and
    remove speed entries from the speed log based on a speed relevance factor.

5. The system as claimed in claim 1 wherein the control unit is configured to determine the speed density peak for one or more sensor speed increments of the speed probability distribution.

6. The system as claimed in claim 1 wherein the control unit is configured to generate the speed probability distribution as a two dimensional kernel density estimation.

7. The system as claimed in claim 1 wherein the control unit is configured to calculate the density regression based on the speed density peak as a linear regression with a method of least square.

8. The system as claimed in claim 1 wherein the control unit is configured to calculate the speed difference value as the difference between the location speed measurement and the sensor speed measurement.

9. The system as claimed in claim 1 wherein the control unit is configured to receive the sensor speed measurement calculated based on motion of mechanical components of a vehicle.

10. The system as claimed in claim 1 wherein the control unit is configured to receive the location speed measurement calculated based on the change in location of a vehicle over a period of time.

11. A method of operation of a navigation system comprising:
    calculating a speed difference value based on a sensor speed measurement and a location speed measurement, wherein the location speed measurement is calculated based on global positioning system tracking;
    generating a speed probability distribution with the speed difference value and the sensor speed measurement;
    calculating a density regression based on a speed density peak of the speed probability distribution;
    determining a speed adjustment factor from the density regression; and
    calculating an adjusted sensor speed from the sensor speed measurement with the speed adjustment factor.

12. The method as claimed in claim 11 wherein generating the speed probability distribution includes generating the speed probability distribution based on an accuracy threshold.

13. The method as claimed in claim 11 wherein calculating the density regression includes calculating the density regression based on a peak weight of the speed density peak.

14. The method as claimed in claim 11 further comprising:
    generating a speed log having speed entries with pairs of the speed difference value and the sensor speed measurement; and
    removing speed entries from the speed log based on a speed relevance factor.

15. The method as claimed in claim 11 wherein determining the speed density peak includes deterring the speed density peak for one or more sensor speed increments of the speed probability distribution.

16. A non-transitory computer readable medium including instructions for operating a navigation system comprising:
    calculating a speed difference value based on a sensor speed measurement and a location speed measurement, wherein the location speed measurement is calculated based on global positioning system tracking;
    generating a speed probability distribution with the speed difference value and the sensor speed measurement;
    calculating a density regression based on a speed density peak of the speed probability distribution;
    determining a speed adjustment factor from the density regression; and
    calculating an adjusted sensor speed from the sensor speed measurement with the speed adjustment factor.

17. The non-transitory computer readable medium as claimed in claim 16 wherein generating the speed probability distribution includes generating the speed probability distribution based on an accuracy threshold.

18. The non-transitory computer readable medium as claimed in claim 16 wherein calculating the density regression includes calculating the density regression based on a peak weight of the speed density peak.

19. The non-transitory computer readable medium as claimed in claim 16 further comprising:
    generating a speed log having speed entries with pairs of the speed difference value and the sensor speed measurement; and removing speed entries from the speed log based on a speed relevance factor.

20. The non-transitory computer readable medium as claimed in claim 16 wherein determining the speed density peak includes deterring the speed density peak for one or more sensor speed increments of the speed probability distribution.

\* \* \* \* \*